United States Patent
Willinger

[15] 3,669,297
[45] June 13, 1972

[54] AUTOMATIC SIPHONING FILTRATION DEVICE

[72] Inventor: Allan H. Willinger, New Rochelle, N.Y.
[73] Assignee: Metaframe Corporation, Maywood, N.J.
[22] Filed: June 3, 1970
[21] Appl. No.: 43,040

[52] U.S. Cl..............................................210/169, 210/238
[51] Int. Cl. ......................................E04h 3/20, B01d 27/08
[58] Field of Search ....................55/524; 210/137, 169, 238, 210/263, 455, 483; 119/5

[56] References Cited

UNITED STATES PATENTS

| | | | |
|---|---|---|---|
| 3,485,373 | 12/1969 | Powers | 210/169 |
| 3,513,978 | 5/1970 | Newsteder | 210/169 |
| 1,985,411 | 12/1934 | Horck | 210/238 |
| 2,353,433 | 7/1944 | Auberschek | 210/238 |
| 3,019,854 | 2/1962 | O'Bryant | 55/524 |
| 3,321,081 | 5/1967 | Willinger | 210/169 |
| 3,511,376 | 5/1970 | Sesholtz | 210/169 |

*Primary Examiner*—Charles N. Hart
*Attorney*—Friedman & Goodman

[57] ABSTRACT

An automatic siphoning filtration device having a filter receptacle provided with communicating compartments to receive a siphon, filtering materials and a pump for use with an aquarium to circulate the aquarium water for the purpose of filtration. The siphon is provided with a tube having an end submerged in the aquarium water, whereby the siphoning action is automatically started when water within the filter receptacle is removed from the siphon compartment. The filtering materials are held within containers positioned in their respective compartments located between the siphon compartment and the pump compartment. The pump is provided with a tube to return clear water to the aquarium, whereby the aquarium water flows from the siphon compartment, through the containers holding the filtering materials, into the pump compartment.

28 Claims, 8 Drawing Figures

PATENTED JUN 13 1972　　3,669,297
SHEET 1 OF 3
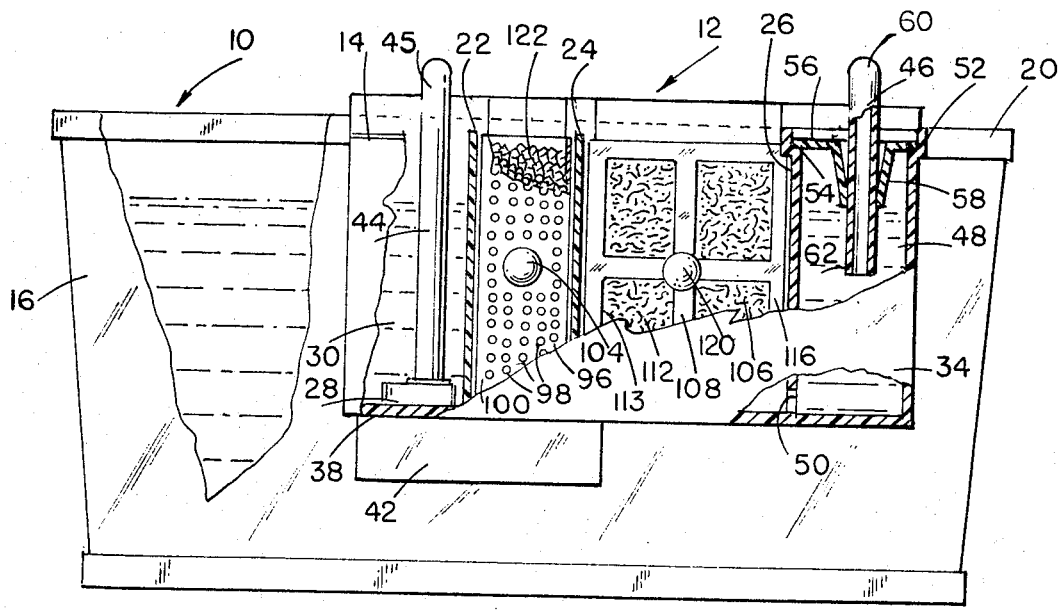
FIG. 1.
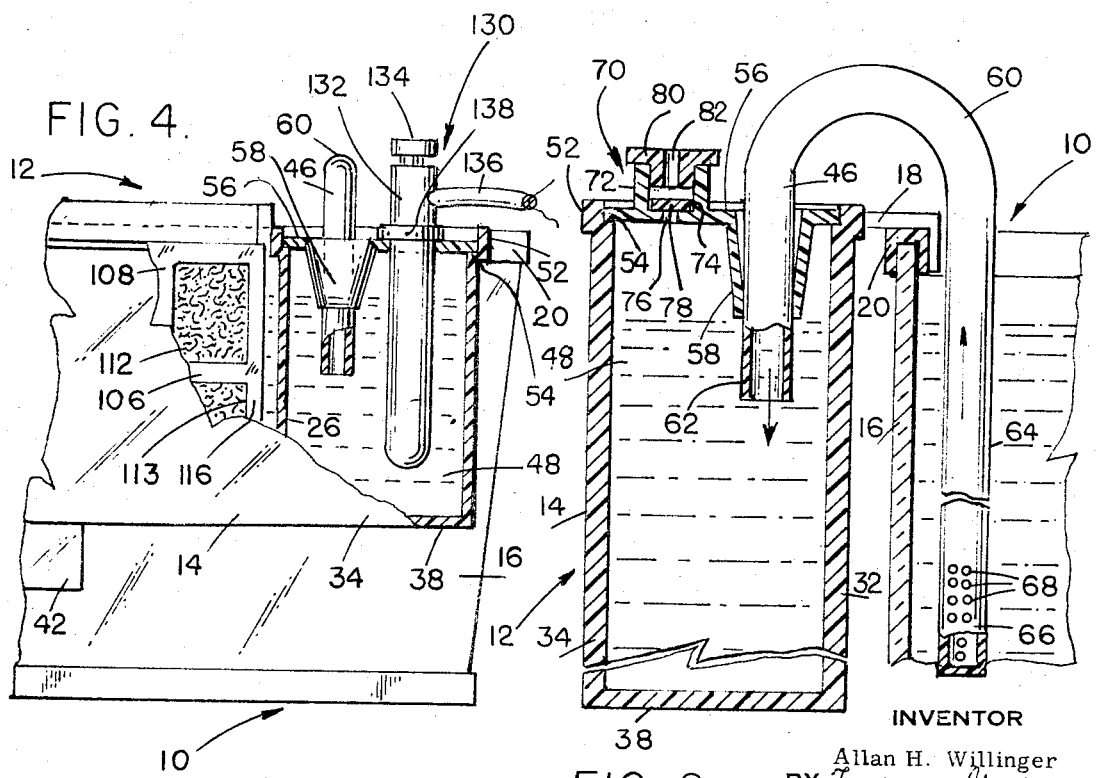
FIG. 4.
FIG. 2.
INVENTOR
Allan H. Willinger
BY Friedman & Goodman
ATTORNEYS

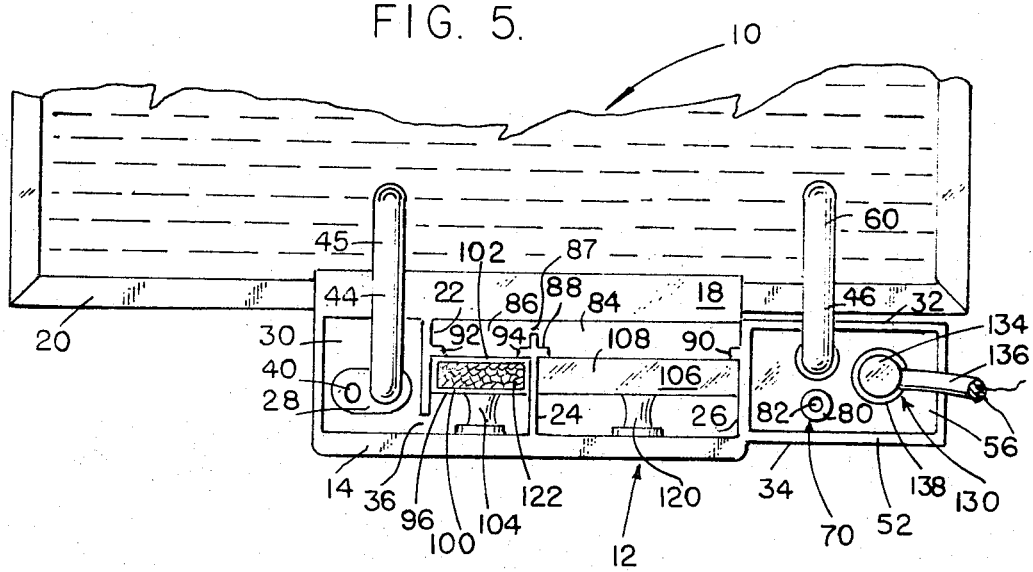
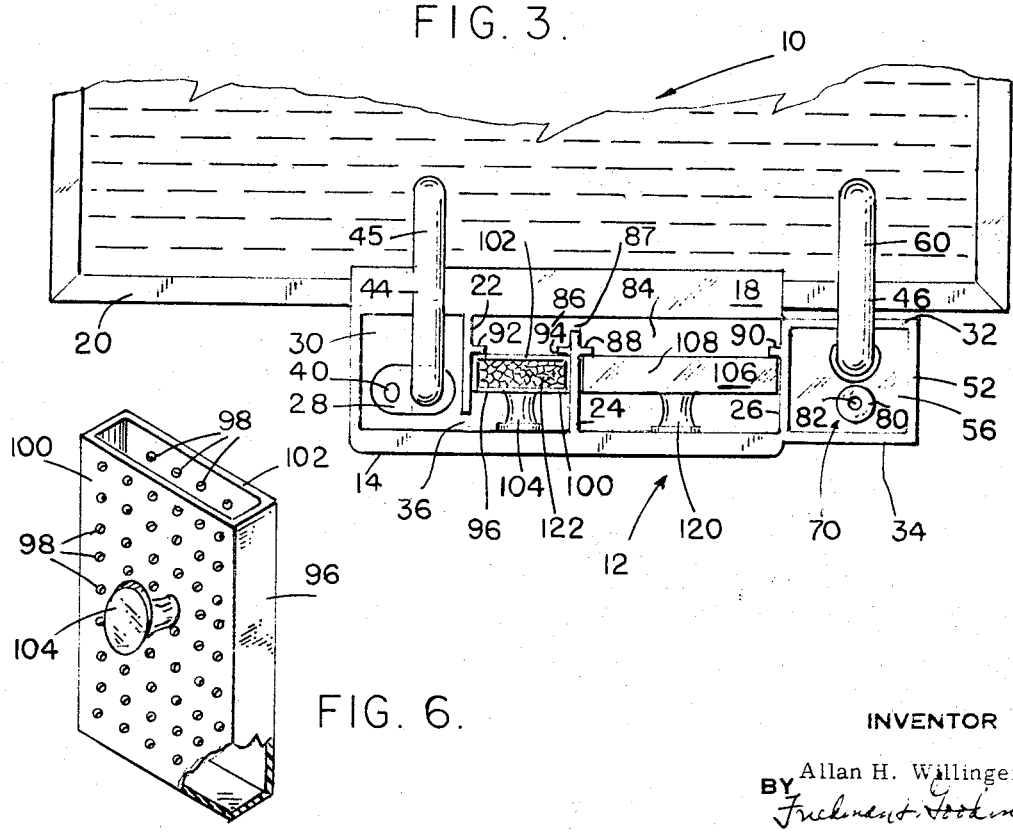

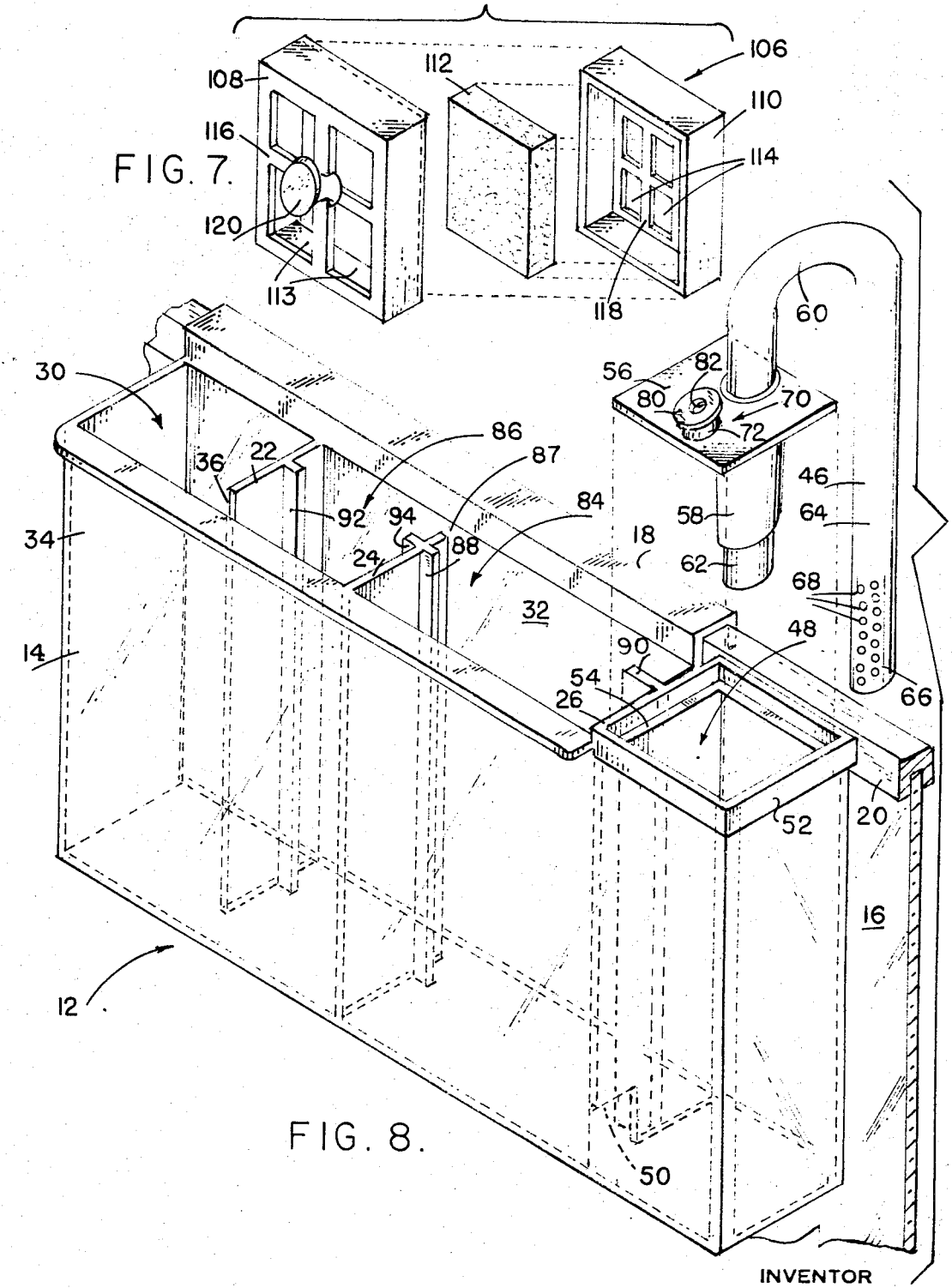

3,669,297

AUTOMATIC SIPHONING FILTRATION DEVICE

BACKGROUND OF THE INVENTION

Filtration devices for an aquarium, which provide a continuous flow of aquarium water from an aquarium tank into a filter tank for the filtration of the water which is later returned to the aquarium tank, are well known in the art as disclosed in U.S. Pat. No. 3,321,081, granted May 23, 1967 to Willinger. The above patent discloses a siphon tube which must be manually filled with water in order to start the siphoning action. Also, the filtering materials are loosely spread over an upper surface of a platform positioned within the receptacle tank.

Starting the siphoning action of a siphon tube by using a bulb is also well known. However, the prior art devices using a bulb, needed a bulb with sufficient internal capacity so that one squeeze of the bulb would have to evacuate all of the air in the siphon so as to lift the water from the aquarium with one squeeze. If that failed it would be required to lift the whole siphon tube and bulb out of the aquarium and replace it in position and start over.

SUMMARY OF THE INVENTION

The present invention relates in general to an aquarium water circulation device, and in particular, to an aquarium siphoning filtration device having an improved water circulation arrangement to circulate the aquarium water for the purpose of filtration. The device comprises a filter receptacle provided with communicating compartments. One of the compartments receives a pump provided with a tube to return clear water to the aquarium. A siphon is located in another compartment to transfer the aquarium water into the filter receptacle, whereby the siphoning action of the siphon is automatically started when the water level within the filter receptacle is lowered. Containers holding filtering materials are positioned in the other compartments. The aquarium water flows from the siphon compartment into the compartments receiving the filtering containers, then through the filtering containers into the pump compartment, the flow being caused by the pumping action drawing the water supplied by the siphon.

Accordingly, an object of the present invention is to provide an improved filtration device having a unique water circulation arrangement to circulate aquarium water for the purpose of filtration which overcomes the disadvantages of the prior art filtering devices.

Another object of the invention is to provide a filtration device which is extremely simple, whereby the device can be readily produced and maintained with relatively little expense, which nevertheless is highly efficient in operation and has a relatively long trouble-free life.

A further object of this invention to provide a filtration device which includes a siphoning device, the siphoning device being automatically primed without one person coming in contact with the aquarium water.

An added object of this invention is to provide a filtration device which includes containers to hold the filtering materials, whereby these containers are easily removable to replace the filtering materials with a fresh supply thereof.

BRIEF DESCRIPTION OF THE DRAWINGS

Having in mind the above and other objects that will be evident from an understanding of this disclosure, the invention comprises the devices, combinations and arrangements of parts as illustrated in the presently preferred embodiment of the invention which is hereinafter set forth in such detail as to enable those skilled in the art readily to understand the function, operation, construction and advantages of it, when read in conjunction with the accompanying drawings in which:

FIG. 1 represents a fragmentary, partly sectional, rear elevational view of an aquarium tank provided with a filtration device pursuant to the present invention;

FIG. 2 represents a fragmentary, vertical transverse sectional view through the aquarium tank, showing an improved siphoning device of the filtration device of this invention having a siphon tube positioned in the aquarium tank;

FIG. 3 represents a fragmentary, top plan view of the aquarium tank, showing the filtration device of this invention;

FIG. 4 represents a fragmentary, partly sectional, rear elevational view of the aquarium tank provided with a modified filtration device of this invention;

FIG. 5 represents a fragmentary, top plan view of the aquarium tank similar to FIG. 3, showing the modified filtration device of this invention;

FIG. 6 represents a perspective view of a container of the filtration device of this invention;

FIG. 7 represents an exploded perspective view of another container of the filtration device of this invention, showing the filtering material;

FIG. 8 represents a fragmentary, exploded perspective view of the filtration device of this invention, showing the compartments therein and the siphoning device.

DESCRIPTION OF THE PREFERRED EMBODIMENT

Referring to the drawings, FIG. 1 illustrates a conventional aquarium tank 10 which is provided with a filtration device which is generally indicated by the reference numeral 12. The filtration device 12 is of the external type and, as here shown, comprises a filter receptacle 14 which is suspended on an outer surface of a rear wall 16 of the aquarium tank 10, though the filter receptacle 14 may be suspended on any wall of the tank 10. More specifically, the filter receptacle 14 is provided with an outwardly extending flange 18 which is hooked over a preferably metallic rim 20 provided on the adjacent rear wall 16 of the aquarium tank 10, as shown in FIG. 2. A spacer (not shown) may extend between the tank 10 and the filter receptacle 14 if needed to maintain the receptacle 14 in an upright position. As here shown, the filter receptacle 14 is essentially rectangular in conformation and is provided with internal partitions 22, 24, 26 to define compartments or chambers therein.

The partition 22 together with the walls of receptacle 14 define a compartment which receives a pump 28, shown in FIGURES 1, 3 and 5, whereby this compartment is hereinafter referred to as a pump chamber 30. The partition 22 extends perpendicularly outwardly from the side wall 32 of the receptacle 14, adjacent to the wall 16 of the tank 10, being spaced from the opposite side wall 34 to provide an opening 36 between the pump chamber 30 and the adjacent compartment. The partition 22 extends perpendicularly upwardly from the bottom wall 38 to the upper portion of the receptacle 14.

The pump 28 may be of the centrifugal type, similar to that disclosed in the above mentioned U.S. Pat. No. 3,321,081. The pump 28 is provided with an opening 40 in an upper portion thereof, to receive the water to be pumped. The pump 28 is mounted on the bottom wall 38. In order to operate the pump 28, provision is made for an electric motor (not shown) housed within a motor housing 42 which is mounted on the bottom wall 38 of the filter receptacle 14, which is also similar to that disclosed in U.S. Pat. No. 3,321,081.

A tube 44 is secured to the upper portion of the pump 28. The tube 44 is provided with a bend 45 at its upper end, which extends over the rim 20 on the upper marginal edge of the wall 16 of the aquarium tank 10, so that the outlet end (not shown) of the tube 44 overlies the interior of the aquarium tank 10, preferably above the level of the water therein.

The partition 26 together with the walls of the receptacle 14 define a second compartment which receives a siphon tube 46, whereby this second compartment is hereinafter referred to as a siphon chamber 48. The partition 26 extends perpendicularly outwardly from the side walls 32, 34 of the receptacle 14, and perpendicularly upwardly from the bottom wall 38 to the upper portion of the receptacle 14. An opening 50 is provided in a lower corner of the partition 26, adjacent to the side wall 34 and the bottom wall 38, to provide communication between the siphon chamber 48 and the adjacent compartment.

An upper portion 52 of the siphon chamber 48 is enlarged providing an abutment 54 therein. A cover member 56 is seated within the enlarged upper portion 52, resting on the abutment 54 to provide an air tight seal therebetween, whereby the cover member 56 may be suitably secured within the portion 52 by a friction fit, or in a substantially permanent manner, as by a suitable adhesive or solvent bond. The cover member 56 includes a conically shaped conduit portion 58 extending downwardly into the siphon chamber 48, the upper opening of portion 58 being larger than the lower opening, whereby the upper opening corresponds in size to an adjacent associated opening provided in the cover member 56.

The siphon tube 46 is of the conventional type, having a U-shaped portion 60 connecting two leg portions 62, 64. The leg portion 62, as shown, is longer than the leg portion 62, however, the leg portion 64 may be made any suitable length. The intake end 66 of the leg portion 64 is provided with a plurality of apertures 68, where the apertures 68 serve to allow the aquarium water to flow therethrough but prevent the passage of fish or other aquarium inhabitants into the siphon tube 46. The leg portion 62 extends through the conduit portion 58 into the siphon chamber 48, whereby the tapered inner walls of the conduit portion 58 provides an air tight friction fit with the leg portion 62 to secure the siphon tube 46 therein. The siphon tube 46 may also be suitably secured in a substantially permanent manner, as by a suitable adhesive or solvent bond, within the conduit portion 58.

The siphon chamber 48 is provided with a one-way valve 70, which is preferably located on the cover member 56. The cylindrical walls 72 of the valve 70 extend upwardly from the cover member 56, with a section of the cover member 56 providing the bottom 74 thereof, to define a hollow member forming the valve 70. An aperture 76 extends vertically through the bottom 74 of the valve 70 so that the space within the valve 70 communicates with the space within the siphon chamber 48.

A flexible member 78, which is preferably round, is positioned within the valve 70, such flexible member 78 being of the conventional type used in valves, being formed from a rubber like material or other suitable material. The inner diameter of the valve 70 is greater than the diameter of the flexible member 78 so that the flexible member 78 rests on the bottom 74 of the valve 70 and covers the aperture 76, as shown in FIG. 2. The flexible member 78 is free to move up and down within the valve 70 because of its smaller sized diameter.

A cap 80 closed the top of the valve 70 to retain the flexible member 78 within the valve 70. The space between the cap 80 and the bottom 74 is greater than the thickness of the flexible member 78 to permit the upward and downward movement of the flexible member 78. An aperture 82 extends vertically through the cap 80. The cap 80 may be press fitted into the valve 70, or other conventional means may be used to secure the cap 80 to the valve 70, such as screw means, to allow the cap 80 to be removed so that the valve 70 may be cleaned inside if the need arose.

FIGS. 4 and 5 illustrate a modification of the filtration device 12, the siphon chamber 48 is provided with a thermostatically controlled aquarium heater 130. The heater 130 is the conventional type, such as disclosed in U.S. Pat. No. 3,107,289, granted Oct. 15, 1963 to Willinger, which may be referred to for a detailed description thereof. Generally, the heater 130 includes an elongated heat-resistant tube 132 housing the heating elements (not shown), a temperature control knob 134 extending from the tube 132, and suitable electrical conductive leads 136 projecting from the tube 132 for connection to a source of electrical power. The tube 132 extends through an opening in the cover member 56 into the siphon chamber 48. A convention collar 138 is secured to the tube 132 to suspend the tube 132 within the siphon chamber 48 and to provide an air tight seal between the tube 132 and the cover member 56, whereby the collar may be secured to the cover member 56 by conventional securing means.

The partition 24 is positioned between the partitions 22, 26, which together with the walls of the receptacle 14 define a large and small compartment, hereinafter referred to as primary and secondary filter chambers 84 and 86, respectively. The partition 24 extends perpendicularly outwardly from the side wall 34 of the receptacle 14, being spaced from the opposite side wall 32 to provide an opening 87 between the primary filter chamber 84 and the secondary filter chamber 86. The partition 24 extends perpendicularly upwardly from the bottom wall 38 to the upper portion of the receptacle 14. The partitions 24 and 26 are provided with vertically extending flanges or ribs 88, 90, respectively, projecting into the primary filter chamber 84, being spaced from the side walls 32, 34 of the receptacle 14. The partitions 22 and 24 are also provided with vertically extending flanges or ribs 92, 94, respectively, projecting into the secondary filter chamber 86, also being spaced from the side walls 32, 34 of the receptacle 14. The function of these flanges 88, 90 and 92, 94 shown best in FIG. 8 will be set forth herein below.

FIG. 6 illustrates a narrow container 96, having a closed bottom and an opened top portion. The container 96 is provided with a plurality of perforations or apertures 98 in the front and rear walls 100, 102 thereof, so that water may flow through the container 96. A handle 104 is centrally disposed on the front wall 100, projecting outwardly from the front wall 100 and being secured thereto by suitable conventional securing means. The free end of the handle 104 is flat. The handle 104 permits a person to conveniently hold and move the container 96, and also serves to position the container 96 preferably within the secondary filter chamber 86 as will be set forth hereinbelow.

FIG. 7 illustrates another narrow container 106, comprising two members 108, 110. The member 110 fits within the member 108 to hold a conventional filter material 112, such as glass wool therein. The fit between the members 108, 110, if desired, may be such as to frictionally secure the two members 108, 110 together, however, a large force should not be required to separate the members 108, 110. The members 108, 110 of the container 106 are provided with a plurality of large apertures 113, 114, respectively, in the front and rear walls 116, 118 respectively, of the container 106, so that water may flow through the container 106, whereby the water passes through the filter material 112 contained therein. A handle 120, similar to the handle 104, is centrally disposed on the front wall 116 of member 108, projecting outwardly from the front wall 16 and being secured thereto by suitable conventional securing means. The free end of the handle 120 is also flat. The handle 120 also permits a person to conveniently hold and move the container 106, and also serves to position the container 106 preferably within the primary filter chamber 84 as will be set forth herein below.

Before the operation of the filtration device 12, the container 96 is filled with a filter material, such as a supply of charcoal 122 being poured through the opened top portion, and is positioned preferably within the filter chamber 86. The rear wall 102 of the container 96 abuts the flanges 92, 94 with the handle 104 abutting the side wall 34 of the receptacle 14 to centrally position the container 96 within the filter chamber 86 with the walls 100, 102 of the container 96 being spaced from the side walls 32, 34 of the filter receptacle 14, as shown in FIGS. 3 and 5, whereby the container 96 may only be moved vertically within the filter chamber 86. When a fresh supply of charcoal is desired, the container 96 may easily be removed from the filter chamber 86 by simply pulling up on the handle 104, whereby the walls of the container 96, which would then be dirty, need not be touched by one's person.

The container 106 holding the filtering material 112 is positioned preferably within the filter chamber 84 in a similar manner to the container 96. The rear wall 118 of member 110 abuts the flanges 88, 90 with the handle 120 abutting the side wall 34 of the receptacle 14 to centrally position the container 106 within the filter chamber 84 with the walls 116, 118 of the container 106 being spaced from the side walls 32, 34 of the filter receptacle 14, as shown in FIGS. 3 and 5, whereby the container 106 may also only be moved in a vertical direction within the filter chamber 84. Here again, when the filter material 112 needs replacement, the container 106 may easily be removed from the filter chamber 84 by simply pulling up on the handle 120 so that one's person need not touch the then dirty walls of the container 106. Either of the containers 96, 106 may be modified as to size to fit in either of the filter chambers 84, 86, whereby if preferred, one type of container may be used in each of the filter chambers 84, 86.

With the containers 96, 106 in place, as shown in FIGS. 3 and 5, the filter receptacle 14 is filled with preferably clean water to a level substantially equal to the level of the water in the aquarium tank 10, as shown in FIGS. 1 and 2, thereby filling the compartments within the filter receptacle 14. As the water fills the siphon chamber 48, through the opening 50, the water tends to compress the air therein above atmospheric pressure, which causes an increase in the air pressure within the siphon chamber 48. However, this increased air pressure forces the flexible member 78 upwards to uncover the aperture 76 formed in the bottom 74 of the valve 70, so that the excess air is forced out through the aperture 76 into the valve 70, which is now in an opened position. Within the valve 70, the excess air is forced around the flexible member 78, and then is forced through the aperture 82 formed in the cap 80, to finally escape to the atmosphere outside the siphon chamber 48. Due to the function of the valve 70, the air pressure in the siphon chamber 48 is equal to the atmospheric pressure acting on the water within the other compartments of the filter receptacle 14. These equal pressures cause the water in each of the compartments of the filter receptacle 14 to have the same level, as shown in FIG. 1.

It is preferable that the filter receptacle 14 be filled to a level whereby the discharge end of the leg portion 62 of the siphon tube 46 is submerged in the water. Because the leg portion 62 is within the siphon chamber 48, the air pressure within the siphon chamber 48 effects the level of the water within the leg portion 62. The atmospheric pressure acting on the water within the aquarium tank 10 effects the level of the water within the leg portion 64. Inasmuch as these above pressures are equal and the levels of the water within the aquarium tank 10 and the filter receptacle 14 are the same, as stated above, the level of the water within the leg portion 62 is the same as the level of the within the leg portion 64.

When the motor is energized, the pump 28 is started, which in turn will automatically start the siphoning action, as set forth hereinbelow. The pump action causes the water in the pump chamber 30 to be drawn into the opening 40 of the pump 28. The pump action forces the water up the tube 44, whereby the water is then discharged into the aquarium water in the aquarium tank 10. As the water is drawn from the pump chamber 30, the water level lowers in the pump and filter chambers 30, 84, 86, which communicate with each other through openings 36 and 87, each of these chambers 30, 84, 86 being open to the atmosphere. This causes the air pressure within the siphon chamber 48 to force the level of the water therein to also lower in an attempt to balance the level of the water within the siphon chamber 48 with the level of the water in the other chambers 30, 84, 86 in the receptacle 14, whereby the water within the siphon chamber 48 flows through the opening 50 into the filter chamber 84.

The volume of the siphon chamber 48 occupied by the air is thereby increased as the level of water drops therein. However, because the flexible member 78 closes the valve 70 so that no air can enter the siphon chamber 48 through the opening 76 in the bottom 74 of the valve 70, the siphon chamber 48 is closed to the atmosphere, whereby the air pressure therein is reduced as the volume occupied by the air therein is increased. Therefore, as the level of the water drops within the siphon chamber 48, the air pressure therein is reduced as the volume occupied by the air therein is increased. Accordingly, as the level of the water drops within the siphon chamber 48, the air pressure therein is further reduced. Also, the difference between the atmospheric pressure acting on the top of the flexible member 78 and the reduced air pressure within the siphon chamber 48 acting on the bottom of the flexible member 78, would tend to keep the flexible member 78 of the valve 70 in the closed position to prevent the air from entering the siphon chamber 48 through the opening 76 of the valve 70.

The air pressure within the siphon tube 46 forces the level of the water in the leg portion 62 to drop, at first in an attempt to balance the level of the water in the leg portion 62 with the level of the water in the siphon chamber 48, and then because the air pressure within the siphon tube 46 is greater than the air pressure within the siphon chamber 48. The volume of the siphon tube 46 occupied by the air tends to increase as the level of the water drops therein, which in turn would tend to reduce the air pressure therein. However, the atmospheric pressure acting on the aquarium water in the aquarium tank 10 forces the aquarium water up the leg portion 64 against the reduced air pressure therein to fill the additional volume occupied by the air within the siphon tube 46, tending to maintain the original air pressure and the original volume occupied by the air within the siphon tube 46. Therefore, as the level of the water continues to drop in the leg portion 62, the level of the water continues to rise in the leg portion 64 of the siphon tube 46. It is noted that if the level of water in the siphon chamber 48 is below the discharge end of the leg portion 62 so that there is no longer any water in the leg portion 62, the level of the aquarium water in the leg portion 64 will still continue to rise because the atmospheric pressure acting on the aquarium water is greater than the air pressure within the siphon chamber 48. It is also noted that the water being discharged into the aquarium tank 10 would raise the level of the water in the aquarium tank 10, which in turn will also cause the level of the water in the leg portion 64 to rise.

The level of the water in the filter receptacle 14 will continue to be lowered until the air pressure in the siphon chamber 48 has been so reduced that the atmospheric pressure has forced the aquarium water up the leg portion 64 into the U-shaped portion 60 of the siphon tube 46. Any further reduction in the level of the water in the filter receptacle 14 will cause the atmospheric pressure to force the aquarium water into the upper part of the leg portion 62. The aquarium water, once in the upper part of the leg portion 62, will tend to move downwardly at a faster rate into the air space therebelow, whereby the momentum of the aquarium water moving through the siphon tube 46 will start the siphoning action.

It is noted that if the valve 70 did not prevent the air from passing back into the siphon chamber 48, the air pressure in the siphon chamber 48 would always be equal to the atmospheric pressure acting on the aquarium water in the aquarium tank 10. Therefore, there would be no air pressure differential to force the aquarium water up the leg portion 64 of the siphon tube 46, which is essential to start the siphoning action in the filtration device 12.

The siphoning action will continue until the level of the water in the filter receptacle 14 is raised again to be equal to the level of the aquarium water in the aquarium tank 10. At this point, the air pressure in the siphon chamber 48 is again equal to the atmospheric pressure. This balance of air pressure maintains the siphon tube 46 in a primed condition, that is, the siphon tube 46 is filled with the water. It is noted that once a siphon tube is in a primed condition, a conventional siphoning action will start when the level of the liquid in one receptacle is lower than the level of the liquid in the other receptacle with the liquid being transferred to the receptacle with the lower level. Therefore, the siphoning action will start again when the level of the water within the filter receptacle 14 is lower than the level of the aquarium water within the aquarium tank 10, so as to provide a continuous flow of the aquarium water from the aquarium tank 10 into the filter receptacle 14 for filtration and the return of the water into the aquarium tank 10.

As shown above, the aquarium water flows from the aquarium tank 10 into the siphon chamber 48, in which the aquarium water may be heated to a selected temperature, if desired, by the heater 130 of the modified form shown in FIG. 4 and 5. The aquarium water is drawn by the pump action through the opening 50 in the partition 26 into the primary filter chamber 84. The aquarium water continues to be drawn, passing through the apertures 113, 114 in the container 106 which is centrally located within the filter chamber 84, so that the filter material 112 contained therein substantially clears the aquarium water as the aquarium water flows therethrough. The substantially clear aquarium water flows through the opening 87 into the secondary filter chamber 86. The aquarium water continues to be drawn, passing through the perforations 98 in the container 96 which is centrally located within the filter chamber 86, so that the charcoal 122 contained therein further clears the aquarium water as the aquarium water flows therethrough. The clear water now flows through the opening 36 into the pump chamber 30 from where the clear water is pumped back into the aquarium tank 10, as stated above, to complete the continuous flow cycle.

The above described parts of the filtration device 12 are preferably formed, as by molding or otherwise, from a suitable plastic. Most of these parts are preferably formed from a transparent plastic so that the operation of the filtration device 12 may be viewed to determine if the device is operating properly. It is contemplated that the filtration device 12 may be adaptable to be attached to most aquarium tanks enhancing its applicability and utilization.

Numerous alterations of the structure herein disclosed will suggest themselves to those skilled in the art. However, it is to be understood that the present disclosure relates to a preferred embodiment of the invention which is for purposes of illustration only, and not to be construed as a limitation of the invention.

What is claimed is:

1. An aquarium filtration device comprising a filter receptacle, a partition disposed within said filter receptacle to define a siphon chamber and a second chamber, said partition being provided with an opening so that water may flow from said siphon chamber to said second chamber, a siphon tube having one leg thereof disposed within said siphon chamber, said siphon chamber including a cover member disposed on an upper portion of said siphon chamber, said cover member being provided with one-way valve means to permit air when compressed above atmospheric pressure within said siphon chamber to escape therefrom and to prevent air from entering said siphon chamber through said valve means, said one leg of said siphon tube extending through an opening in said cover member, and means to cause the water to flow from said siphon chamber to said second chamber thereby lowering the level of the water in the siphon chamber to reduce air pressure within said siphon chamber to automatically start a siphoning action, whereby aquarium water is forced through said siphon tube into said siphon chamber.

2. An aquarium filtration device according to claim 1 wherein said upper portion of said siphon chamber is enlarged to define abutment means therein, said cover member being positioned within said enlarged upper portion against said abutment means to provide an air tight seal therebetween.

3. An aquarium filtration device according to claim 1 wherein said cover member includes a conically shaped conduit portion communicating with said opening in said cover member and extending downwardly into said siphon chamber, said conduit portion being provided with an upper opening larger than a lower opening, said upper opening being the same size as said opening in said cover member, said one leg of said siphon tube extending through said conduit portion with said one leg engaging the inner walls of said conduit portion to provide an air tight friction fit therebetween.

4. An aquarium filtration device according to claim 1 wherein said valve means includes walls disposed on said cover member and extended therefrom to enclose an outer wall section of said cover member to define a hollow valve member, said section being provided with an aperture extending therethrough into said siphon chamber, a flexible member positioned within said hollow member and resting against said section to cover said aperture in said section.

5. An aquarium filtration device according to claim 4 wherein cap means closes said valve member to retain said flexible member therein, said cap means being spaced from said section of said cover member to permit movement of said flexible member away from said section to uncover said aperture in said section, said cap means being provided with an aperture to permit air within said valve member to escape therefrom.

6. An aquarium filtration device comprising a filter receptacle, a partition disposed within said filter receptacle to define a siphon chamber and a second chamber, said partition being provided with an opening so that water may flow from said siphon chamber to said second chamber, a siphon tube having one leg thereof disposed within said siphon chamber, said siphon chamber including a member covering said siphon chamber, said member defining a part of an upper portion of said siphon chamber, said upper portion being provided with one-way valve means to permit air when compressed above atmospheric pressure within said siphon chamber to escape therefrom and to prevent air from entering said siphon chamber through said valve means, said one leg of said siphon tube extending through an opening in said upper portion, and means to cause the water to flow from said siphon chamber to said second chamber thereby lowering the level of the water in the siphon chamber to reduce air pressure within said siphon chamber to automatically start a siphoning action, whereby aquarium water is forced through said siphon tube into said siphon chamber.

7. An aquarium filtration device according to claim 6 wherein said valve means includes walls extending from said siphon chamber to define a hollow valve member, said siphon chamber being provided with an aperture communicating with said hollow valve member, and a flexible member positioned within said hollow valve member to cover said aperture.

8. An aquarium filtration device according to claim 7 wherein cap means closes said valve member to retain said flexible member therein, said cap means being spaced from said aperture of said siphon chamber to permit movement of said flexible member to uncover said aperture, said cap means being provided with an aperture to permit air within said valve member to escape therefrom.

9. An aquarium filtration device according to claim 6 wherein said device is formed from a plastic material.

10. An aquarium filtration device according to claim 9 wherein said plastic material is transparent so that the operation of said device may be viewed.

11. An aquarium filtration device according to claim 6 wherein said means causing the water to flow comprises a pump positioned in said filter receptacle, said pump being provided with a tube, whereby said pump draws and forces the water into said pump tube from where the water is discharged into an aquarium tank.

12. An aquarium filtration device according to claim 6 wherein a container adapted to hold filter material is disposed within said second chamber, said container being provided with a plurality of apertures therein so that the water may flow through said container, and abutment means disposed on said container for positioning said container within said second chamber, whereby the filter material clears the water passing through said container.

13. An aquarium filtration device according to claim 12 wherein said container comprises two members, one of said container members removably fitting within the other of said container members to hold the filter material within said container between said two members.

14. An aquarium filtration device according to claim 12 wherein said container includes a closed bottom and is provided with an opened top portion through which said container is filled with the filter material.

15. An aquarium filtration device according to claim 1 wherein a second partition together with said first mentioned partition and two walls of said filter receptacle define said second chamber, said second partition extending outwardly from one of said two walls and being spaced from the other of said two walls to define an opening through which the water may pass to a third chamber, said opening in said first mentioned partition being positioned adjacent to said one wall of said receptacle.

16. An aquarium filtration device according to claim 15 wherein a container adapted to hold filter material is disposed within said second chamber, said container being provided with a plurality of apertures therein so that the water may flow through said container, and abutment means being disposed on said container for positioning said container within said second chamber, whereby the filter material clears the water passing through said container.

17. An aquarium filtration device according to claim 16 wherein said first mentioned and second partitions are provided with flanges extending into said second chamber, said container being positioned against said flanges with said abutment means engaging said one wall of said receptacle to position said container within said second chamber.

18. An aquarium filtration device according to claim 17 wherein said abutment means comprises a handle projecting outwardly from said container, said handle including a free end, said free end providing a flat abutment surface which is positioned against said one wall to space said container from said one wall of said receptacle, said flanges being spaced from said other wall of said receptacle so that said container is centrally located within said second chamber.

19. An aquarium filtration device according to claim 15 wherein a third partition together with said second partition and said two walls of said filter receptacle define said third chamber, said third partition extending outwardly from said other wall of said receptacle and being spaced from said one wall of said receptacle to define an opening through which the water may pass to a fourth chamber.

20. An aquarium filtration device according to claim 19 wherein a first container adapted to hold filter material is disposed within said second chamber, a second container adapted to hold filter material is disposed within said third chamber, each of said containers being provided with a plurality of apertures therein so that the water may flow therethrough, and abutment means disposed on each of said containers for positioning each of said containers within its respective chamber, whereby the filter materials clear the water passing through said containers.

21. An aquarium filtration device according to claim 20 wherein said means causing the water to flow comprises a pump positioned in said fourth chamber of said filter receptacle, said pump being provided with a tube, whereby said pump draws and forces the water into said pump tube from where the water is discharged into an aquarium tank.

22. An aquarium filtration device according to claim 20 wherein said first mentioned and second partitions are provided with a first set of flanges extending into said second chamber, said second and third partitions are provided with a second set of flanges extending into said third chamber, said first container being positioned against said first set of flanges, said second container being positioned against said second set of flanges, said abutment means of each container engaging said one wall of said receptacle to position each container within its respective chamber.

23. An aquarium filtration device according to claim 22 wherein each of said abutment means comprises a handle projecting outwardly from its respective container, each of said handles including a free end, said free end of each of said handles providing a flat abutment surface which is positioned against said one wall to space each of said containers from said one wall of said receptacle, said sets of flanges being spaced from said other wall of said receptacle so that each of said containers is centrally located within its respective chamber.

24. An aquarium filtration device according to claim 6 wherein a thermostatically controlled heater is disposed in said siphon chamber to heat the water within said siphon chamber to a selected temperature.

25. An aquarium filtration device according to claim 12 wherein said abutment means comprises a handle, said handle including a free end, said free end providing a flat abutment surface which is positionable against a wall of said second chamber, whereby said handle permits said container to be easily positioned into and removed from said second chamber.

26. An aquarium filtration device according to claim 25 wherein said handle is centrally disposed on a front wall of said container, said handle projecting outwardly from said front wall to space said front wall from said wall of said second chamber.

27. An aquarium filtration device according to claim 25 wherein said container includes a closed bottom and is provided with an opened top portion through which said container is filled with the filter material.

28. An aquarium filtration device according to claim 25 wherein said container comprises two members, a front wall of said container being part of one of said two members and a rear wall of said container being part of the other of said two members, said other member removably fitting within said one member to hold the filter material within said container between said front and rear walls.

* * * * *